United States Patent [19]

Oetiker et al.

[11] Patent Number: 4,721,561

[45] Date of Patent: Jan. 26, 1988

[54] CENTRIFUGAL FORCE SEPARATOR

[75] Inventors: Hans Oetiker, Gallen; Franz Reichmuth, Flawil, both of Switzerland

[73] Assignee: Gebruder Buhler AG, Uzwil, Switzerland

[21] Appl. No.: 805,476

[22] PCT Filed: Apr. 15, 1985

[86] PCT No.: PCT/EP85/00167

§ 371 Date: Nov. 26, 1985

§ 102(e) Date: Nov. 26, 1985

[87] PCT Pub. No.: WO85/04823

PCT Pub. Date: Nov. 7, 1985

[30] Foreign Application Priority Data

Apr. 16, 1984 [DE] Fed. Rep. of Germany ....... 3414344

[51] Int. Cl.[4] .............................................. B01D 45/12

[52] U.S. Cl. ...................................... 209/144; 55/416; 55/459 R

[58] Field of Search ............. 209/144; 55/416, 459 R, 55/459 B

[56] References Cited

U.S. PATENT DOCUMENTS

| | | | |
|---|---|---|---|
| 1,659,695 | 2/1928 | Mayhew | 209/144 X |
| 1,920,117 | 7/1933 | Tenney | 209/144 |
| 2,381,954 | 8/1945 | Hardirge | 209/144 |
| 2.931,581 | 4/1960 | Lykken et al. | 209/144 X |
| 3,116,238 | 12/1963 | Van Etter | 55/459 R |
| 4,028,076 | 6/1977 | Fields | 55/459 B X |

FOREIGN PATENT DOCUMENTS

| | | |
|---|---|---|
| 1078859 | 3/1960 | Fed. Rep. of Germany . |
| 1954256 | 12/1966 | Fed. Rep. of Germany . |
| 1279538 | 10/1968 | Fed. Rep. of Germany . |
| 2051533 | 3/1979 | Fed. Rep. of Germany . |
| 571222 | 8/1945 | United Kingdom . |
| 725723 | 3/1955 | United Kingdom . |
| 1056067 | 1/1967 | United Kingdom . |
| 1536905 | 12/1978 | United Kingdom . |
| 2038670 | 7/1980 | United Kingdom . |
| 1603079 | 11/1981 | United Kingdom . |
| 153196 | of 1963 | U.S.S.R. . |
| 430870 | 6/1975 | U.S.S.R. . |
| 880514 | 11/1981 | U.S.S.R. . |

*Primary Examiner*—Andres Kashnikow
*Assistant Examiner*—Mary Beth O. Jones
*Attorney, Agent, or Firm*—Darby & Darby

[57] ABSTRACT

A centrifugal force separator for broken grains, husks, dust and other impurities from air has a pre-separating chamber (2) with a tangential raw gas inlet (1), in which a cylindrical deflecting screen (4) and a clean gas outlet (5) axially adjoining the latter are concentrically arranged. To increase the degree of dust separation at only a slight pressure loss and in the case of an inexpensive construction, and also to enable application in return-air systems in combination with other cereal crop cleaning and processing machines, a pre-separating chamber (X) for an air circulation is provided radially outside the deflecting screen (4), and an air discharge (Y) is provided radially inside the deflecting screen (4), which air discharge (Y) is in flow connection with the pre-separating chamber (X) via air passage channels (17) in the deflecting chamber (4).

12 Claims, 5 Drawing Figures

CENTRIFUGAL FORCE SEPARATOR

FIELD OF THE INVENTION

The invention relates to a centrifugal force separator for broken grains, husks, dust and other impurities from air, having a pre-separating chamber with a tangential raw gas inlet, a cylindrical deflecting screen arranged concentrically therein and a pure gas outlet axially adjoining the deflecting screen.

BACKGROUND OF THE INVENTION

Centrifugal force separators have been used successfully for decades in the area of mills and fodder mills. The greatest advantage of traditional cyclone separators lies in their simple method of construction and their relatively low air resistance. In the general case, the cyclones are used with a vertical axis and in rare cases are slightly inclined. The separated substances are collected in the lower area of the centrifugal force separator and discharged via a product valve. In the upper peripheral area, the air enters tangentially into the cyclone and, after several vortex motions, leaves it centrally in the uppermost area through the so-called "immersion tube" which projects slightly into the inside of the cyclone.

The main disadvantage of the cyclone lies in its relatively poor efficiency for dust separation. In the cyclone, a plurality of superimposing secondary vortex motions develop which, together with a fluctuating air pressure and varying dust charge, prevents for practical application, a substantial improvement in the degree of separation. A further disadvantage is that, particularly in the area of a mill or a fodder mill when cyclones are used as separators, the exhaust air still has residual dust contents which are substantially above the statutory permissible values. For industrial plants, therefore, the exhaust air of cyclones has to be additionally cleaned via filters before it may be discharged into the open air.

To this day, many proposals for the improvement of cyclone separators have been made, but with a few exceptions these have been unable to achieve success in practice. One of these exceptions is described in the DE-B No. 1,078,859. Here, a centrifugal force separator is used which has a horizontal axis in the form of a twin centrifugal force separator or a primary and secondary separator. The primary separator is constructed in a spiral and approximately circular shape, with the raw gas entering tangentially. The outermost air layer is "peeled off" as it were at the opposite end of the spiral chamber and fed into a substantially smaller secondary separator, in which (similar to traditional cyclone separators) the clean air and the dust are separated at both end sides. An advantage of this separator system lies in the very low pressure loss, but its disadvantage lies in an inadequate degree of separation.

Recently, there has been a noticeable tendency to use the individual cleaning machines which require very large air quantities in return-air operation, for example, in a mill (cf., eg., GB-A No. 1,536,905). However, return-air machines require relatively clean air, for two reasons: if too large a proportion of dust is contained in the return air, there is the danger of a permanent bacterial contamination of the material, especially if this is raw material for human food. If there is a lot of dirt and dust in the return air, the entire machine will become blocked by dust in a short time. Either breakdowns occur frequently or much more cleaning work has to be performed.

Although the quality requirements for the return air do not need to be as high as the statutory regulations for the quality of industrial exhaust air into the open air, the quality requirements for the return air, from experience, are always much greater than could be guaranteed by the efficiency of known centrifugal force separators or cyclone separators.

Starting from this basis, it is the object of the invention to develop a centrifugal force separator for broken grains, husks and dust and other impurities from cereal crops, which has a substantially increased degree of dust separation at only a slight pressure loss, is inexpensively constructed and is suitable for use in return-air systems in particular in combination with other cereal crop cleaning and processing machines.

In a centrifugal force separator of the type mentioned at the beginning, this object is achieved according to the invention in that a pre-separating chamber for an air circulation is provided radially outside the deflecting screen, and an air discharge is provided radially inside the deflecting screen, which air discharge is in flow connection with the pre-separating chamber via air passage channels in the deflecting chamber. As a result of the invention, two chambers are created which can be controlled and are precisely determined as regards flow, by which means a very extensive separation of impurities from the air can be achieved.

In an advantageous further development of the invention, the pre-separating chamber is made circular in cross-section and is arranged directly above a funnel-shaped collector which, at its upper side, is divided from the pre-separating chamber by a curved deflecting wall in such a way that air circulation openings remain on both outer sides of the pre-separating chamber.

The centrifugal force separator according to the invention was first of all tested in conjunction with an aspiration channel having a preselected dust charge, with surprisingly good results being obtained.

The tangential raw gas inlet preferably has an inflow arranged in a curved shape and pointing in the same direction towards the pre-separating chamber. In this especially preferred design of the centrifugal force separator according to the invention, the action of the centrifugal force is already well prepared in the inflow of the pre-separating chamber. At the same time, disturbing, "superimposed" turbulence is avoided on entering into the pre-separating chamber, in particular if the tangential raw gas inlet essentially extends over the entire length of the pre-separating chamber.

A raw gas inlet in the upper area of the preseparating chamber, in which the air flow runs in the clockwise direction in the pre-separating chamber and the air flows out of the raw gas inlet from bottom left upwards into the pre-separating chamber, has thus far proved to be the best solution. In this connection, a particularly undisturbed flow and a remarkably effective separation of the impurities from the air are obtained if the deflecting screen has an upper section impermeable to air. At the same time, the air becomes enriched suprisingly quickly with the foreign bodies present in it during the course of a semi-circular motion in the pre-separating chamber in the zone next to the walls, so that this enriched outer partial flow can discharge all foreign bodies when flowing over into the funnel-shaped collector. Two main active forces occur in the collector itself: on the one hand, the foreign bodies fall downwards as a result of gravity; on the other hand, however, the centrifugal force also acts here again, because all of the air flowing into the collector can flow back again into the pre-separating channel on the collector side opposite the inflow point. At the same time, however, individual dust or husk particles being pulled along again cannot be avoided. However, the probability of these particles still being deposited at the bottom in the collector during a subsequent through-flow is very great - as tests show.

The inner partial flow largely freed of foreign bodies enters at the inner side of the curved deflecting wall into the space between the latter and the deflecting screen. At the same time, however, a small quantity of dust particles and injected grains unfortunately cannot be prevented from being pulled along with the inner partial flow. To clean the inner partial flow of these foreign bodies too, various further advantageous embodiments of the invention have proved successful:

Thus, in a quite especially preferred further development of the invention, the deflecting screen only has air passage channels in its lower section. The air passage channels are also advantageously arranged in the deflecting screen in the area of the latter which is facing towards or is opposite the deflecting wall curved in a circular shape. Moreover, the deflecting screen, with particular advantage, has essentially radially arranged guide vanes, that is, arranged transversely to the rotational flow of the air, with, again advantageously, air passage channels between the guide vanes forming a deflecting angle for the air flow of more than 90°. Furthermore, the air passage channels are preferably made such that the aspirated air quantity enters irrotationally into the clean gas outlet.

In a centrifugal force separator according to the invention, it is also of particular advantage if, in front of the funnel-shaped collector, in the area of the raw gas inlet, a channel is provided for returning the air into the pre-separating chamber. The deflecting wall curved in a circular shape is made particularly advantageously if it has a lower boundary with such a spiral shaped portion, the space between the deflecting screen and deflecting wall opens, again advantageously, into the air return channel.

To guide the air such that it is free of cross turbulence, the deflecting screen, preferably in its upper area, is closed over an angle of more than 180°. It is also proposed for the advantageous embodiment of the invention to have the deflecting wall which is curved in a circular shape to start in the area of the horizontal center plane of the deflecting screen and to make it over an angle between 90° and 180°.

In a further preferred embodiment of the invention, the raw gas inlet is made as the upper area of a vertical aspiration channel, with the clean gas outlet preferably being connected to a lower inlet, arranged at the aspiration channel, in such a way that the aspiration channel works in return-air operation. The best results for a purposeful selection of a desired grain material category in the aspiration channel and for a subsequent separation of the remaining grain material categories or husks or dust particles in the centrifugal force separator can be achieved if, in a centrifugal force separator according to the invention, a rear wall of the aspiration channel can be adjusted in both its inclination and horizontal direction (thus in a double respect).

The centrifugal force separator according to the invention has proved surprisingly successful when used in combination with an aspiration channel for cereal crops. In this application, all good and heavy cereal grains are to be freed by the aspiration channel of any foreign content (ie. husk parts, dirt, dust, and also broken grains and shriveled kernels and the like). To re-separate the relatively large quantity of foreign content completely and economically from the air has proved to be a great problem in the past, which hitherto could not be solved satisfactorily. Here, the use of a centrifugal separator according to the invention showed for the first time a completely satisfactory separation effect, such as could not even be achieved approximately hitherto.

BRIEF DESCRIPTION OF THE DRAWINGS

The invention is described below in principle in greater detail by way of example with reference to the drawing, wherein.

DETAILED DESCRIPTION OF THE PREFERRED EMBODIMENTS

Figure 2:
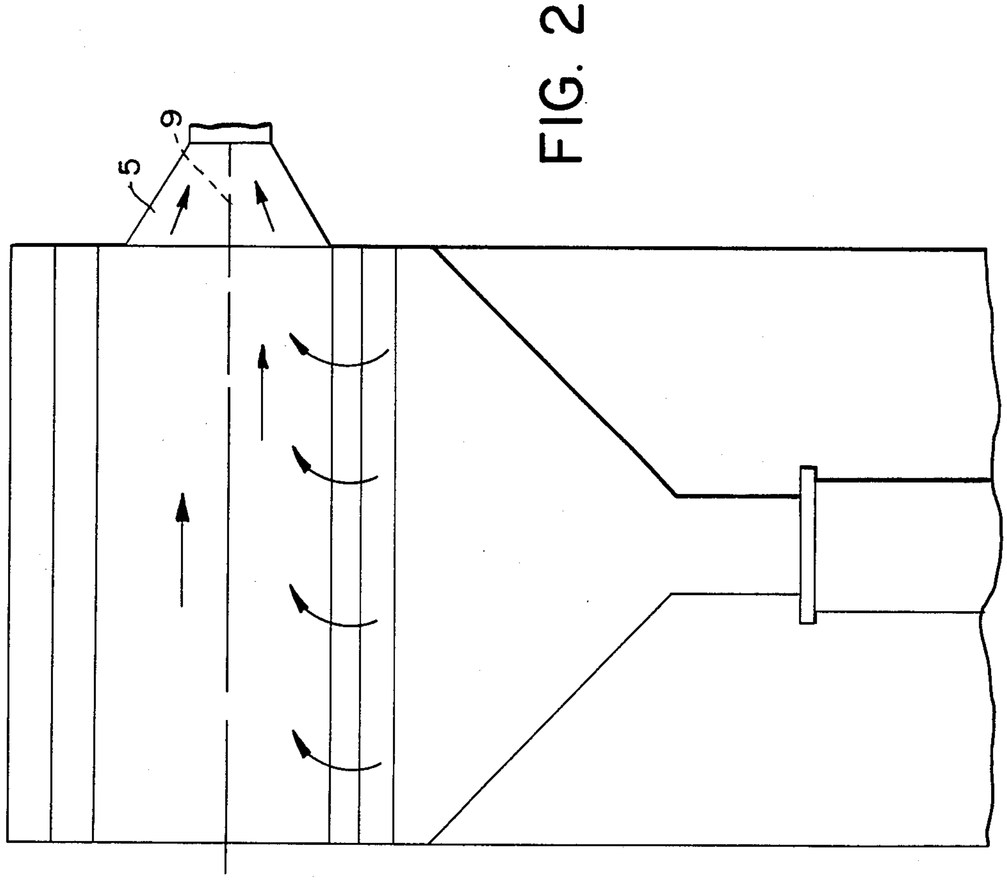
FIG. 2 shows a dissection II—II from FIG. 1.
Figure 1:
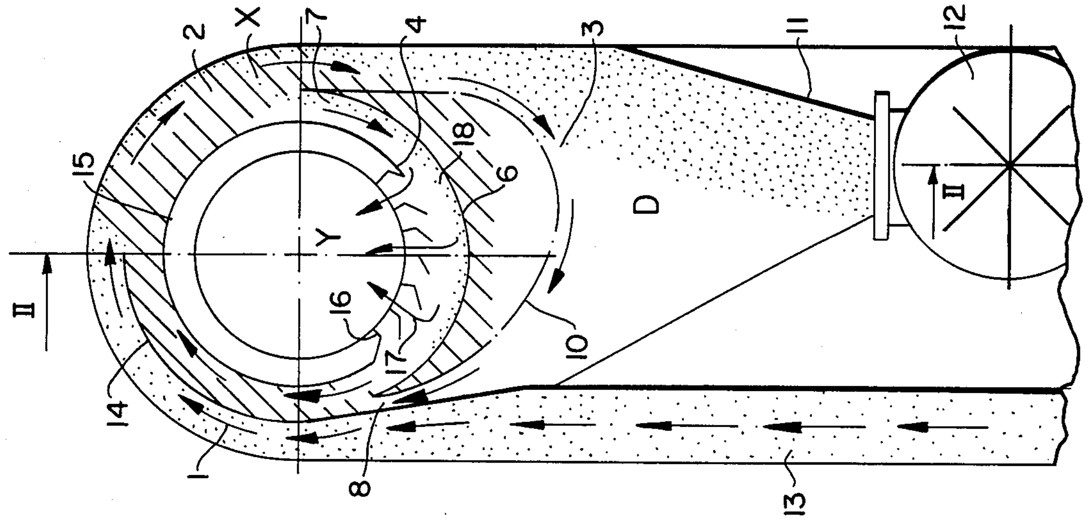
FIG. 1 shows a diagrammatic section through a centrifugal force separator.

As can be seen from FIG. 1, the essential basic construction of the centrifugal force separator consists of a tangential raw gas inlet 1, a pre-separating chamber 2 and a funnel-shaped collector 3. A preferably fixed deflecting screen 4 is provided inside the pre-separating chamber 2 which extends essentially in a circular shape, on the inner axial end of which deflecting screen 4 is arranged a clean gas outlet 5. The pre-separating chamber 2 is defined at the bottom by a deflecting wall 6 curved in a circular shape, with air-circulation openings 7 and 8 remaining on both sides. The deflecting wall 6 starts (right-hand side in FIG. 1) approximately at the level of the horizontal center plane of the deflecting screen 4 and runs over an area of more than 90° over to the left-hand side of the figure.

The deflecting wall 6 consists of a curved steel sheet, with the same radius of curvature being present on both sides towards the pre-separating chamber 2 as well as towards collector 3. For a greater deflection of the air flow into the collector 3, the lower boundary of the deflecting wall 6 can be made, for example, according to the chain-dotted line 10. The collector 3 has a conical funnel 11 and a rotational valve 12 at the bottom for the air-tight discharge of dust.

It has proved to be advantageous if a straight channel piece 13 is connected directly in front of the raw gas inlet, so that the flow in the area of the raw gas inlet 1 is stabilized to as great an extent as possible. The raw gas inlet 1 is divided from the preseparating chamber 2 via a wall section 14 over a sector of almost 90°.

The upper lying part of the deflecting screen 4 is made impermeable to air as a cylindrical casing 15. The deflecting screen 4 has a plurality of radially aligned guide vanes 16 only in its lower area, with an air passage opening 17 forming between adjacent guide vanes 16. The outer section of the guide vanes at 16 is set at an inclined angle, so that the arriving flow must deflect through more than 90° to penetrate at this point into the intermediate space between the guide vanes 16. Particular reference is made here to the diagrammatic representation of this angling of the outer sections of the guide vanes 16 in FIGS. 1, 3 or 5. By means of this measure, the air is forced to make a relatively pronounced change in direction when it enters into the raw gas outlet 5. At the same time, because of their inertia, even finer dust particles cannot follow this change in direction and are pulled by the rotational flow into a separatory channel 18 into the area of the air-circulation openings 7 and 8 and again flow into the zone of the raw gas inlet 1. During a second or repeated through-flow, these foreign particles are also carried into the collector 3 and separated.

The air passage openings 17 are aligned radially inwards, so that an irrotational flow develops inwards and in this way any onset of imbalance in the flow cycle inside the pre-separating chamber 2 is avoided.

In FIG. 1, a pre-separating zone X is shown hatched, in which a strong air circulation takes place, so that dust particles have the repeated opportunity to be deposited in a zone D in the collector 3. The inner area enclosed by the pre-separating zone X and not hatched in FIG. 1 is designated as "irrotational air discharge" Y, in which a controllable separation of clean air and residual dust takes place, which separation is unaffected by the air circulation in the pre-separating zone X.

Figure 3:
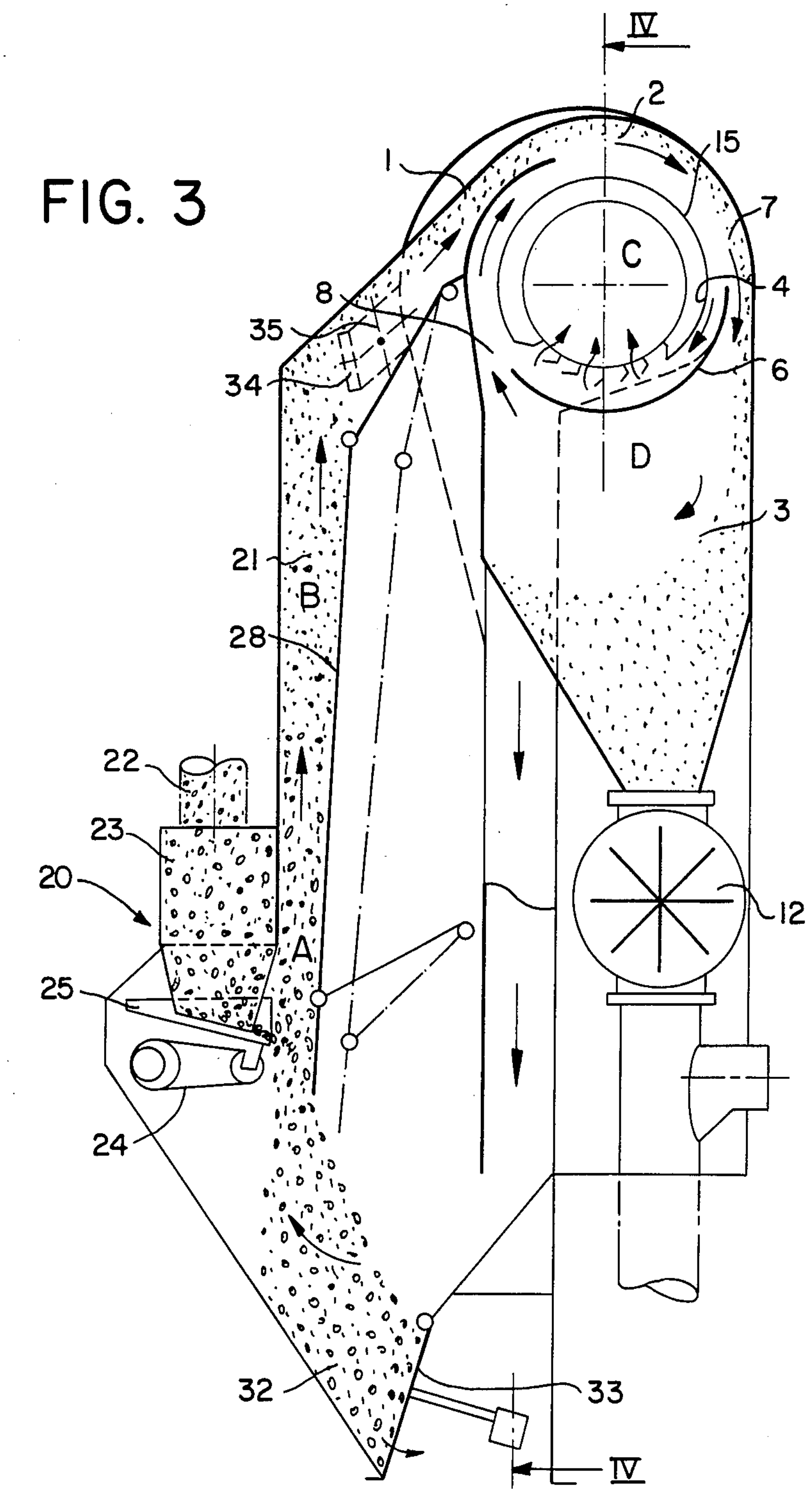
FIG. 3 shows the combination of an aspiration channel having a centrifugal force separator according to the invention.
Figure 4:
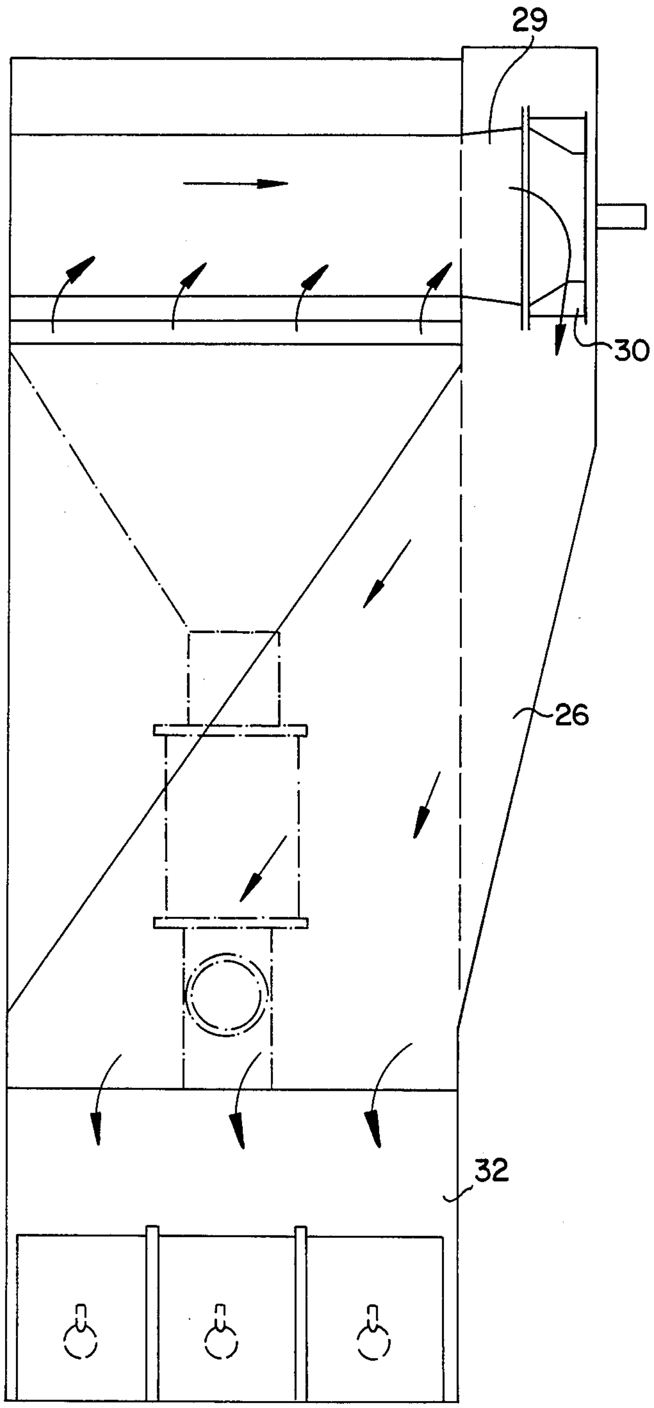
FIG. 4 shows a section IV—IV from FIG. 3.

FIGS. 3 and 4 show a further illustrative embodiment of a centrifugal force separator according to the invention which usefully interacts with a vertical aspiration channel. By means of the solution shown here, a particularly effective and selective separation of good quality grain and remainder of the poorer grain quality (broken grain and shriveled kernels) located therein, as well as the undesirable dirt and solid substances still present in the cereal crop, is possible by means of air.

The removal of very coarse impurities which are larger than cereal grains is carried out by sizing screens; stones are removed by stone sifters. These two operations are preferably to be carried out in one operation executed beforehand.

In principle, the separation achieved by the centrifugal separator according to the invention takes place in four spatially separated zones:

A first zone A in the initial area of the aspiration channel 21 represents the pre-sorting zone known per se. The uncleaned grain material is fed in here and well aerated by an air jet. All heavy grains fall downwards; both an average category and the undesirable light impurities are carried further by the air flow into the aspiration channel 21, namely into an adjoining zone B. This zone B enables the average category to be distributed into a portion which still pertains to the good heavy grains, and into a lighter portion which is discharged by the air flow, together with the remainder of the impurities, into an adjoining zone C which consists of the preseparating zone X and the irrotational air discharge Y.

Finally, the remaining air charge (such as dust, etc.) is separated in a fourth zone D which is located in the collector 3.

The distribution in the aspiration channel 21 also takes place here in that the flow profile in the aspiration channel 21 can be purposefully adapted to the particular separation task. Depending on their rate of descent, the individual particles are thrown by the air flow at variable height into the channel and again fall downwards. If necessary, this operation is repeated several times until the particles either find a path upwards or completely downwards.

Zones A and B merge smoothly into one another, because the air flow must develop its active force here. Here, grain material is fed into the air, the grain material is purified of foreign bodies and the category to be separated by the air is led away.

However, the function in the zones C and D is fundamentally different:

Here, the basic idea is that the entire foreign content to be separated is if possible concentrated in an outer border area of the air flow in a chamber specifically created for this purpose, namely the zone C. Only this concentrated border layer is guided, namely via the air-circulation openings 7, into the zone D, that is, into the collector 3, where virtually the entire foreign content can be separated. However, by the interaction of the two zones C and D, a completely new advantage comes to bear, which is that individual injected grains or particles pulled coincidentally by the air flow out of the collector 3 and back into the zone C run through the sequence of zone C to zone D once, twice or repeatedly until they are finally separated in the collector 3 (zone D). Zone C is of such a great effectiveness that only a negligibly small dust portion is pulled through the deflecting screen 4 together with the clean air. In the entire system, however, which works preferably as a return-air system, this very small dust content is negligible, as tests have shown.

Such a system is shown in FIGS. 3 and 4:

The raw grain material is fed into an aspiration channel 21 by a feed or metering device 20, from where it enters via a supply pipe 22 into a small pre-feed chamber 23. An eccentric drive 24 shakes the latter via a correspondingly elastically mounted feed table 25, by which means a uniform product cloud, approximately of the same thickness over the entire length, enters into the aspiration channel 21. The air is guided from a return-air channel 26 through the product cloud into the aspiration channel 21. Here, a wall 28 is arranged such that it is double-adjustable, so that the aspiration channel 21 can be adjusted with regard to both the through-flow cross-section and its shape in the flow direction. For the aspiration channel 21, therefore, any cross-section which is approximately constant from top to bottom or a V-shaped cross-section (ie. a cross-section which becomes continuously larger or smaller in the flow direction) can be set. In the return-air system shown in FIGS. 3 and 4, a radial ventilator 30 is attached directly in the area of a clean gas outlet 29, which radial ventilator 30 guarantees the necessary air circulation for the return air. The entire air quantity is fed back via the returnair channel 26. The cleaned grain material is transferred for further transport via a discharge funnel 32, with flap valves 33 being provided here, too, for avoiding disturbances in the infiltrated air and undesirable air turbulence. The separated impurities are likewise transferred for correspondingly determined further transport via the rotational valve 12. The air quantity required can be set via the rotational speed of the radial fan 30.

Of course, the solution according to FIGS. 3 and 4 can work as a partial return-air system. In this case, an aspiration system is connected to a corresponding aspiration connection 34 having air-adjusting flaps 35, and the entire device can be set under a light vacuum.

In a corresponding constructional modification, it would also be conceivable to have the deflecting screen 4 rotatable. In such a solution, the upper part of the deflecting screen 4, which is made as a casing 15 impermeable to air, would preferably be of stationary construction.

In the sections in which the appearance of injected grains need not be feared, the casing 15 could have penetrations for the air ingress. It has been shown that the casing 15, at least at the point where the raw gas inlet 1 enters into the pre-separating chamber 2 as well as at the start of the deflecting wall 6, should remain closed.

Figure 5:
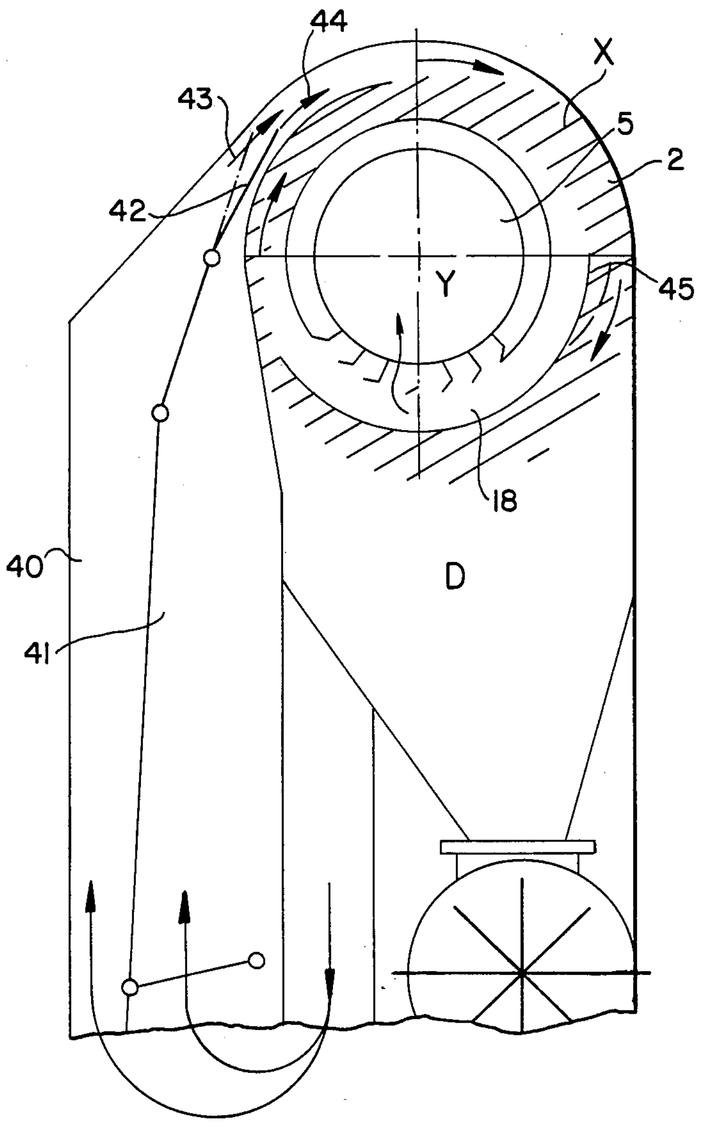
FIG. 5 shows a further embodiment of the air and dust guidance in a centrifugal force separator according to the invention.

A further variant for a centrifugal force separator according to the invention is shown in FIG. 5.

A vertical channel piece 40 works as an aspiration channel as in the representation according to FIG. 1; however—other than in FIG. 1—a release chamber 41 is directly allocated to it, so that, in the case of a return-air circulation from the pre-separating chamber 2 or a corresponding return-air channel 26 (FIG. 4), a portion of the air in the channel piece 40 and a portion of the air in the release chamber 41 can circulate. The optimum air quantity or air velocity can be set via an adjusting flap 42 acting as a choke, as indicated by the arrows 43 and 44 in FIG. 5.

Moreover, it is possible to distribute the flow in the pre-separating chamber 2 by a further flap 45 in such a way that the greater portion of circulating air is diverted into the pre-separating zone X or into the inner irrotational air discharge Y. In this way, although the air quantity which flows off as clean air through the clean gas outlet 5 is not affected, the local air velocities in the separatory chamber 18 and in the air circulation opening 7 are affected. In this way, the two working chambers X and Y can themselves be controlled in the case of very awkward separating tasks, such as, for example, in the separation of maize categories.

What is claimed is:

1. In a centrifugal force separator for extracting particulate impurities from air, the separator being of the type including a housing, means in the housing defining an interior wall in the shape of a circumferential segment of a cylinder and a tangential raw gas inlet, cylindrical deflecting means extending within the housing in opposed relationship to the interior wall, the deflecting means being hollow, having an air inlet and serving as an exhaust conduit for cleaned air to a clean gas outlet, and collecting means for the particulate impurities provided in the housing below the deflecting means, the improvement comprising:

said deflecting means having a peripheral opening facing toward said collecting means;

an arcuate deflecting wall positioned opposite said opening in the cylindrical deflecting means and curving around said cylindrical deflecting means, said deflecting wall having upstream and downstream ends each extending circumferentially beyond a respective extreme of said opening and each spaced from said interior wall so as to form an air circulation space for the passage of circulating air between each end of the deflecting wall and the interior wall;

the space between the interior wall and said cylindrical deflecting means in the vicinity of said upstream end of said deflecting wall defining a pre-separating chamber; and means defining a channel extending between the air circulation space at the downstream end of said deflecting wall and the raw gas inlet for returning circulating air to said preseparating chamber.

2. A centrifugal force separator as claimed in claim 1, wherein the tangential raw gas inlet has an inflow arranged in a curved shape and pointing in the same direction towards the pre-separating chamber.

3. A centrifugal force separator as claimed in claim 1, wherein the arcuate deflecting wall includes a lower boundary having a spiral shaped portion.

4. A centrifugal force separator as claimed in claim 3, wherein the space between the deflecting screen and the deflecting wall curved in a circular shape opens into the air return channel.

5. A centrifugal force separator as claimed in claim 1, wherein the raw gas inlet forms the upper end of a vertical aspiration channel.

6. A centrifugal force separator as claimed in claim 5, wherein the clean gas outlet is connected to a lower inlet, arranged at the aspiration channel, in such a way that the aspiration channel works in return-air operation.

7. A centrifugal force separator as claimed in claim 5, wherein a rear wall of the aspiration channel can be adjusted in both its inclination and the horizontal direction.

8. A centrifugal force separator in accordance with claim 1, wherein said cylindrical deflecting means has an upper section impermeable to air and extending over more than 180° and an air permeable lower section defined by said opening, said separator further comprising guide vanes arranged only in said lower section of said deflecting means and forming a plurality of air passage channels therein, said guide vanes being curved and having an outer section and an inner section, said inner section being oriented substantially radially with respect to said cylindrical deflecting means, and said outer section being inclined with respect to said inner section so as to point in the downstream flow direction of the circulating air.

9. A centrifugal force separator in accordance with claim 1, wherein the upstream end of said deflecting wall is located in the area of a horizontal plane extending through the center of the deflecting means, said deflecting wall extending therefrom over a circumferential angle between 90° and 180°.

10. A centrifugal force separator in accordance with claim 9, wherein said cylindrical deflecting means has an upper section impermeable to air and extending over more than 180° and an air permeable lower section defined by said opening, said separator further comprising guide vanes arranged only in said lower section of said deflecting means and forming a plurality of air passage channels therein, said guide vanes being curved and having an outer section and an inner section, said inner section being oriented substantially radially with respect to said cylindrical deflecting means, and said outer section being inclined with respect to said inner section so as to point in the downstream flow direction of the circulating air.

11. A centrifugal force separator as claimed in claims 8 and 10, wherein the air passage channels between the guide vanes form a deflecting angle for the air flow of more than 90°.

12. A centrifugal force separator as claimed in claim 11, wherein the air passage channels are made such that the aspirated air quantity enters irrotationally into the clean air outlet.

* * * * *